(12) United States Patent
Gigante et al.

(10) Patent No.: US 11,111,042 B2
(45) Date of Patent: Sep. 7, 2021

(54) SEALING AND GUIDING SYSTEM FOR A PACKAGING MACHINE

(71) Applicant: G.D SOCIETA' PER AZIONI, Bologna (IT)

(72) Inventors: Antonio Gigante, Bologna (IT); Luca Cavazza, Bologna (IT); Andrea Biondi, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 6 days.

(21) Appl. No.: 16/461,399

(22) PCT Filed: Nov. 22, 2017

(86) PCT No.: PCT/IB2017/057326
§ 371 (c)(1),
(2) Date: May 16, 2019

(87) PCT Pub. No.: WO2018/096465
PCT Pub. Date: May 31, 2018

(65) Prior Publication Data
US 2020/0055624 A1 Feb. 20, 2020

(30) Foreign Application Priority Data
Nov. 23, 2016 (IT) .................. 102016000118480

(51) Int. Cl.
*B65B 51/16* (2006.01)
*B25J 21/00* (2006.01)
*B65B 65/02* (2006.01)

(52) U.S. Cl.
CPC ............. *B65B 51/16* (2013.01); *B25J 21/005* (2013.01); *B65B 65/02* (2013.01)

(58) Field of Classification Search
CPC ......... B65B 51/16; B65B 55/00; B65B 65/02; B25J 21/00; B25J 21/005
See application file for complete search history.

(56) References Cited

U.S. PATENT DOCUMENTS 5,575,176 A * 11/1996 Rohrs ..................... B25J 21/00
                                                                     269/71
6,802,203 B1 * 10/2004 Averill ................. F16J 15/3296
                                                                    277/320

(Continued)

FOREIGN PATENT DOCUMENTS

EP     2801267 A2 *  5/2014 ............. A24C 5/326
EP     2801267 A2    11/2014

OTHER PUBLICATIONS

International Application No. PCT/IB2017/057326, International Search Report and Written Opinion, dated Apr. 3, 2018.

*Primary Examiner* — Andrew M Tecco
*Assistant Examiner* — Nicholas E Igbokwe
(74) *Attorney, Agent, or Firm* — Marshall, Gerstein & Borun LLP

(57) ABSTRACT

The invention relates to a sealing and guiding system for a packaging machine having a processing zone and an activation zone adjacent each other. The system has a separating wall, for separating the processing zone from the activation zone; at least a movement actuating element, which develops from the activation zone to the processing zone, crossing the separating wall and that has a longitudinal developing axis; movement actuating means, arranged in the activation zone, for moving the movement actuating element at least along a first direction transverse to the respective axis.

11 Claims, 6 Drawing Sheets

(56) References Cited

U.S. PATENT DOCUMENTS 8,720,666 B2 * 5/2014 Papsdorf .............. B65G 47/847
198/377.02
8,820,513 B2 * 9/2014 Papsdorf ........... A61F 13/15764
198/478.1

* cited by examiner

SEALING AND GUIDING SYSTEM FOR A PACKAGING MACHINE

CROSS-REFERENCE TO RELATED APPLICATIONS

This is U.S. national phase of International Application No. PCT/IB2017/057326, filed Nov. 22, 2017, which claims the benefit of Italian Patent Application No. 102016000118480, filed Nov. 23, 2016.

TECHNICAL FIELD

The present invention falls within the technical field of automatic machines for packaging products. In detail, the invention relates to a sealing and guiding system for a packaging machine.

BACKGROUND ART

Said systems are generally used in machines for packaging products such as those in the pharmaceutical, foodstuff or cosmetic fields. As known, packaging machines used in these fields must perform product processing in highly hygienic if not aseptic conditions, and are designed to avoid, as much as possible, any type of contamination of the processed products.

For this purpose, the packaging machines dedicated to the aforementioned fields, at the processing stations (filling, capping, etc.), comprise a system that separates two distinct zones: a processing zone, where the products on which the processing means operate are conveyed and must meet certain hygiene requirements, and an activation zone in which actuating mechanisms for means which operate on the products in the processing zone are provided. The above described system must therefore guarantee the hermetic seal of the processing zone and, at the same time, allow the movement of the operating means between the two zones.

The above-mentioned system, in detail, comprises a separating wall or an insulating barrier, through which a shaft passes from the activation zone and develops in the processing zone and which carries the processing means. The shaft is moved by suitable actuators, arranged in the activation zone.

If the shaft only has to perform rotational movements around its axis, there is a reduced risk of contamination from the activation zone towards the processing zone, as it is possible to guarantee the hermetic seal of the processing zone due to the presence of sealing gaskets suitably arranged around the same movement actuating shaft.

When it is instead necessary to translate the shaft parallel to the wall which divides the two zones, for example in a direction perpendicular to the respective axis, the system comprises seals formed by an elastic bellow, through which the translating shaft can be moved. However, this system has drawbacks.

Firstly, the elastic material with which the bellow is made, for example rubber, may be subject to damage or breakage without showing direct evidence, thus causing a probable contamination of the processing zone. These breakages may be due to mechanical wear and to damage due to particularly intense washing (e.g. from steam jets or other hot and/or pressurized substances).

Furthermore, the cleaning of the bellow type sealing system is not practical for its conformation, whether it is performed manually or automatically.

Alternatively, in order to limit the contamination problem, systems are provided for sucking air from the processing zone towards the zone in which the mechanisms are arranged. In detail, an intermediate chamber is provided between the processing zone and the zone in which the mechanisms are arranged, in the zone in which the suction means are arranged. However, said solution does not guarantee the absolute absence of contaminations in the processing zone.

Patent Application EP2801267A2 discloses a device transferring rod-shaped smoking articles.

Patent US5575176A discloses an apparatus or manipulator for positioning objects within a sealed chamber.

DISCLOSURE OF INVENTION

The object of the present invention is to overcome the drawbacks mentioned above.

This object is achieved by proposing a sealing and guiding system according to the appended claims.

Advantageously, the invention is able to avoid the transfer of contaminants and/or bacteria from the activation zone, in which the mechanisms and the actuators are arranged, towards the processing zone, where the processing of the products takes place, without compromising, among other things, the productivity of the machine.

Furthermore, with the invention the structural complications foreseen in some prior art solutions to avoid contamination of the processing zone are not necessary.

A further advantage consists in the fact that the solution proposed with the invention is easily cleanable, and resistant even to aggressive washing.

BRIEF DESCRIPTION OF THE DRAWINGS

Further advantages will be made clear in the following discussion, with the aid of the attached drawings, wherein.

BEST MODE FOR CARRYING OUT THE INVENTION

Figure 1:
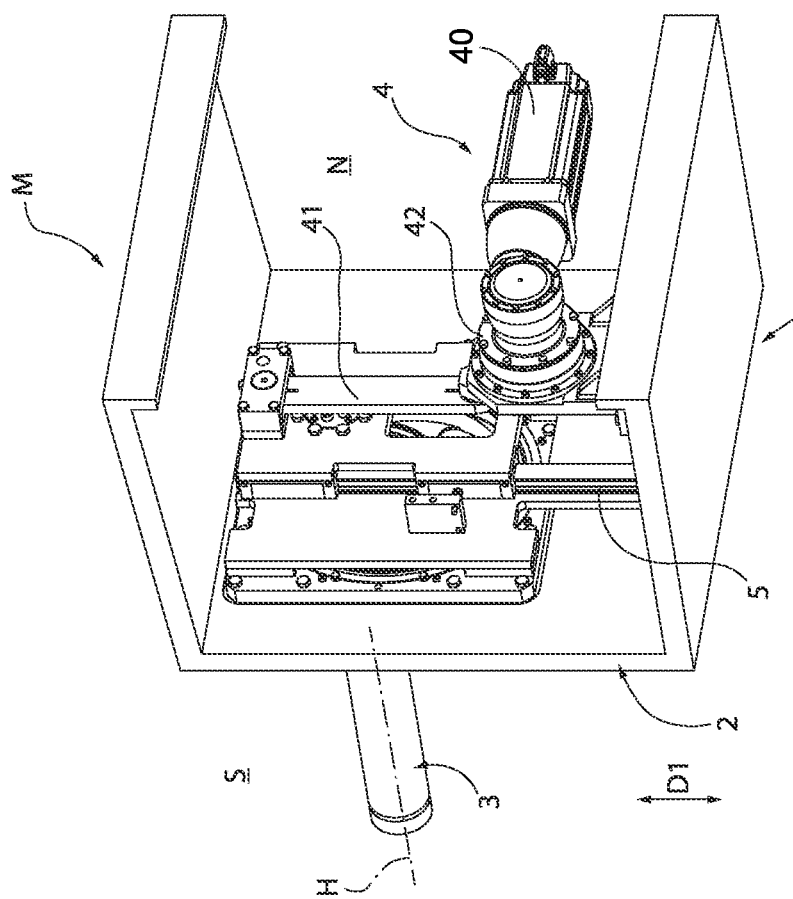
FIG. 1 is a perspective front view of a sealing and guiding system according to the present invention, arranged in a packaging machine, in a first operating situation.
Figure 2:
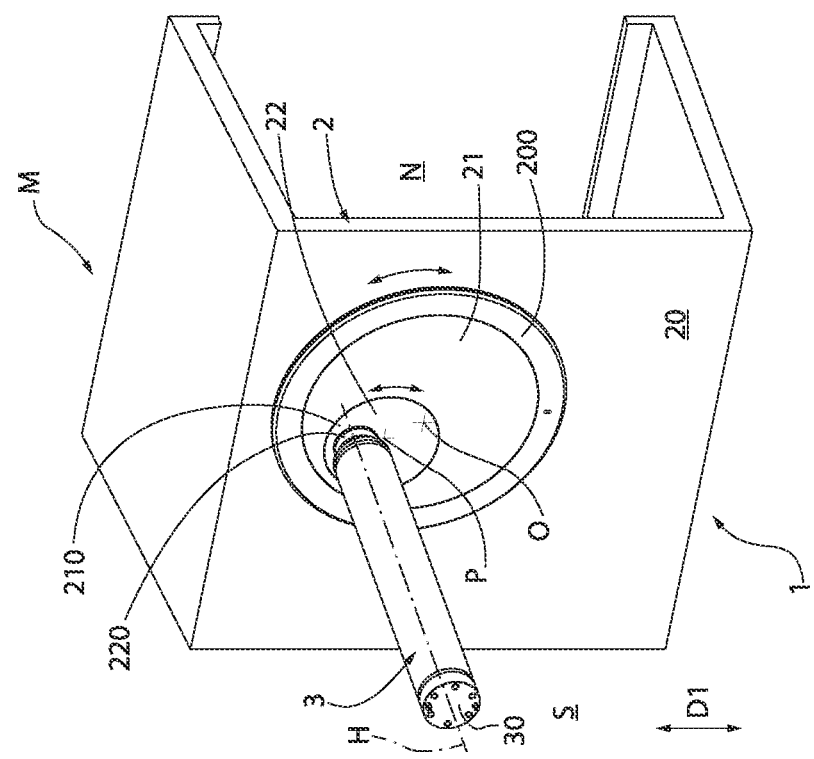
FIG. 2 is a perspective, rear view of the system of FIG. 1.
Figure 4:
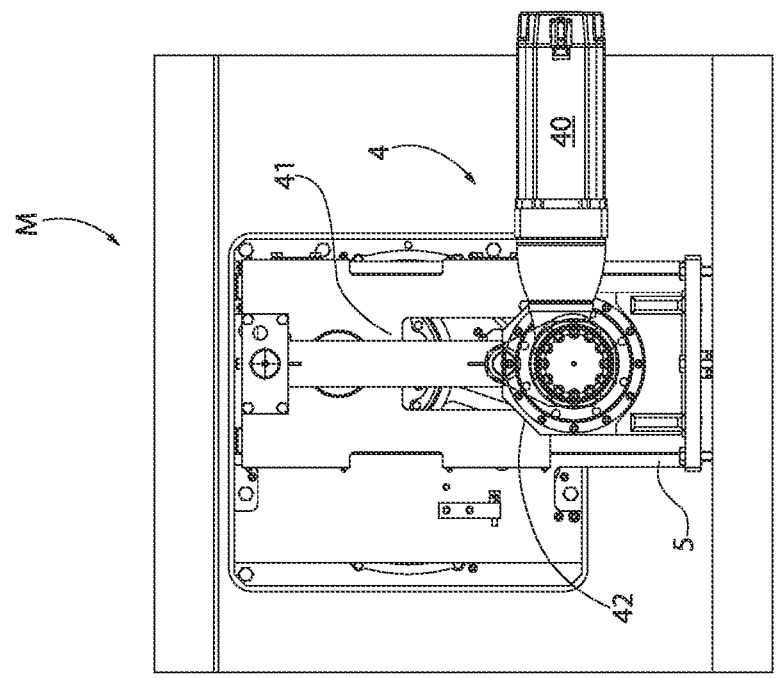
FIG. 4 is a non-perspective rear view of the system of FIG. 1.
Figure 3:
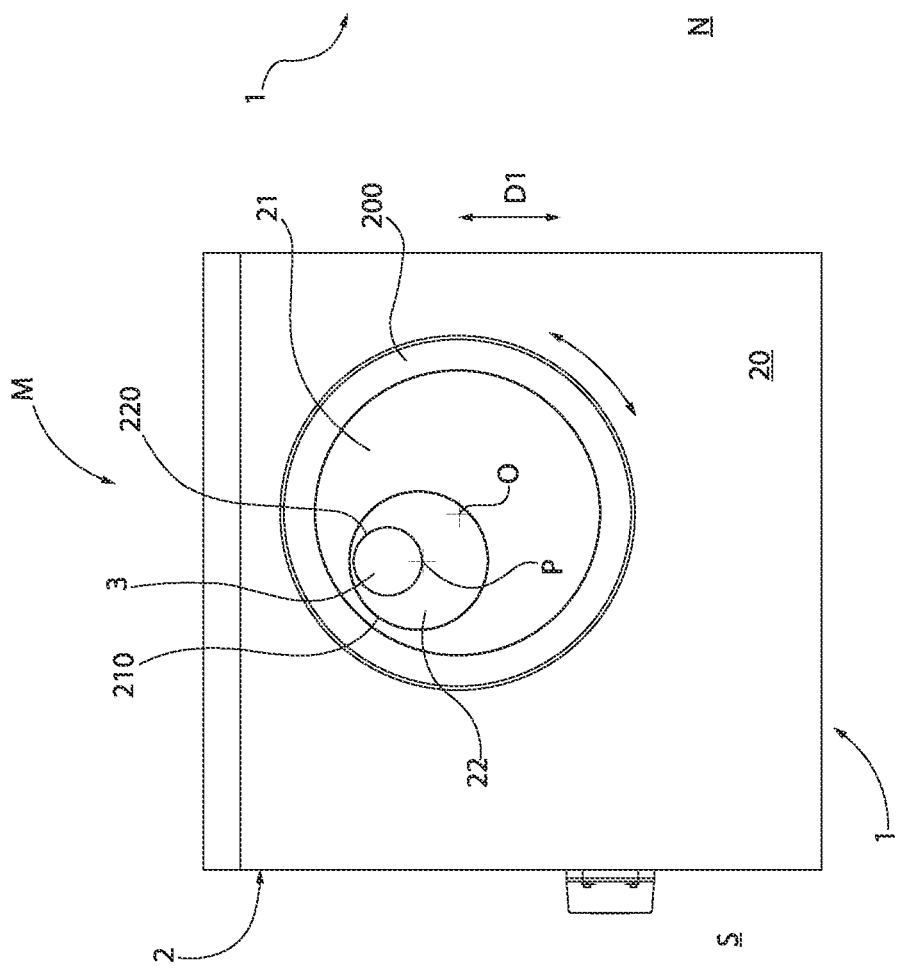
FIG. 3 is a non-perspective front view of the system of FIG. 1.

With reference to the attached figures, 1 denotes a sealing and guiding system for a packaging machine M (only partially illustrated), which comprises a processing zone S and an activation zone N, adjacent to each other. For example, the packaging machine M is a machine in the foodstuff, pharmaceutical or cosmetic field.

The processing zone S is the zone of the machine M in which the products are conveyed to be processed, while the activation zone N is the zone of the machine M in which the activation mechanisms for the means which operate on the products in the processing zone S (as will be better clarified with the following discussion). As already specified in the introduction, the processing zone S must comply with certain hygiene requirements, to avoid contamination of the processed products. In the case of machines in the pharmaceutical field, the processing zone S is in sterile conditions.

The system 1 comprises: a separating wall 2 for separating the processing zone S from the activation zone N of the packaging machine M; at least one movement actuating element 3 (shown in the figures in an exemplary and partial way as a shaft 3), that extends from the activation zone N to the processing zone S, crossing the separating wall 2. In other words, the movement actuating element 3 has a respective portion 30 arranged in the processing zone S, and a respective portion 300 arranged in the activation zone N (the latter is particularly visible in FIG. 5).

The system 1 further comprises: movement actuating means 4 arranged in the activation zone N, for moving the movement actuating element 3 at least along a first direction D1 (indicated by way of example in the figures), transversely (i.e. non-parallel) to the respective axis H. For example, the first direction D1 can be parallel to the separating wall 2, and in the illustrated embodiment it is perpendicular to the axis H of the movement actuating element 3.

In particular, the separating wall 2 comprises: a first part 20 comprising, in turn, a first housing delimited by a first circular edge; and a first disk 21, that can be inserted in the first housing, so as to be rotatable with respect to the first part 20. The first disk 21 comprises, in turn, a second housing delimited by a second circular edge, eccentric with respect to the center O of the first disk 21.

The separating wall 2 further comprises a second disk 22, that can be inserted in the second housing so as to be rotatable with respect to the first disk 21.

The second disk 22 comprises, in turn, a third housing delimited by a third circular edge, that is eccentric with respect to the center P of the second disk 22, with the movement actuating element 3 which is inserted in the third housing. In other words, the movement actuating element 3 passes through the separating wall 2 at the third housing of the second disk 22, to which it is constrained (in particular to which it is rotatably connected), so as to be eccentric with respect to the center P of the second disk 22.

Moreover, the system 1 comprises rotary sealing means 200, 210, 220, arranged at the first housing, at the second housing and at the third housing, allowing the sealing between the processing zone S and the activation zone N and the relative rotation of the first disk 21, of the second disk 22 and of the movement actuating element 3.

In the system 1, therefore, there is a first rotoidal torque between the first part 20 of the separating wall 2 and the first disk 21. Furthermore, there is a second rotoidal torque, determined between the first disk 21 and the second disk 22, and a third rotoidal torque determined between the movement actuating element 3 and the second disk 22.

With reference to what has been illustrated, the first part 20 of the separating wall 2 is fixed (forming a frame).

Advantageously, the fact that the first disk 21 can rotate with respect to the first part 20 of the separating wall 2 and that the second disk 22, eccentric with respect to the first disk 21, can rotate with respect to the latter (carrying the movement actuating element 3 in an eccentric and rotating manner, due to the rotary sealing means (200, 210, 220), allows translating movements of the movement actuating element at least along a first direction D1 transverse to the respective axis H (preferably along a first direction D1 parallel to the separating wall 2, as illustrated in the attached figures). In detail, the axes of the first disk 21 and of the second disk 22 are parallel to each other, and the first direction D1 lies on a plane perpendicular to the rotation axes of the first disk 21 and of the second disk 22. With particular reference to the figures, in a preferred, but not exclusive solution, also the axis H of the movement actuating element 3 (which is a shaft in the illustrated solutions) is parallel to the rotation axes of the first disk and of the second disk 22. Therefore, in this specific case, the first direction D1 is also perpendicular to the axis H of the movement actuating element. For the sake of clarity, however, it is emphasized that the rotation axis of the third rotoidal torque formed between the movement actuating element 3 and the second disk 22 is not necessarily coincident with the axis of the movement actuating element 3. The condition sufficient for the operation of the system is that the rotational axes of the first rotoidal torque, of the second rotoidal torque and of the third rotoidal torque described above are parallel to each other.

In other words, the system 1 proposed with the invention can guarantee the sealing of the processing zone S, while allowing the motion of the movement actuating element 3 in the aforementioned first direction D1, without the need to provide "bellow type" systems or the arrangement of suction means, as was instead necessary with systems of known type. This is guaranteed by the fact that, with the system 1, the movement actuating element 3 is not subjected to axial translations.

It is understood that with the expression "separating wall" used in the present discussion, it is not intended exclusively a flat wall as illustrated in the attached examples, but the expression is intended to be extended to any element (or plurality of elements) of any geometry (also not uniform), of any material and having any inclination in space, which is adapted to separate two adjacent environments from each other.

From FIGS. 1-5, relating to a first configuration of the system 1, and from FIGS. 6-9 relating to a second configuration of the system 1, it is possible to observe the translation of the movement actuating element 3 by means of the kinematic mechanism offered by the system 1. Clearly the maximum stroke of the movement actuating element 3 at least along the aforementioned first direction D1 depends on the sizes of the diameter of the first disk 21 (i.e. of the largest disk) and on the ratio between the diameter of the first disk 21 and the diameter of the second disk 22, i.e. on the dimensions of the first disk 21, of the second disk 22 and of the movement actuating element 3.

Figure 5:
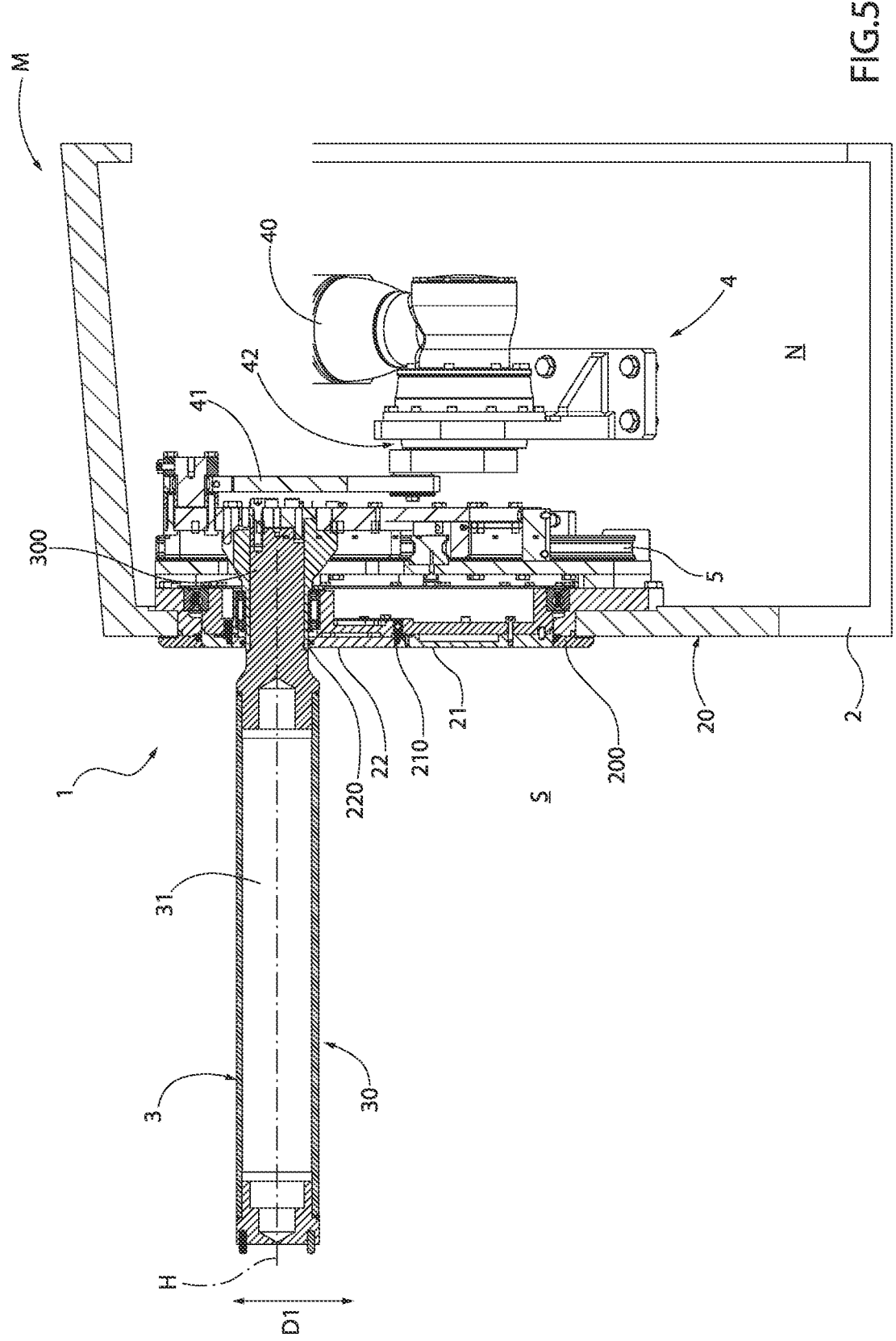
FIG. 5 is a side view, partially sectioned, of the system of FIG. 1.
Figure 7:
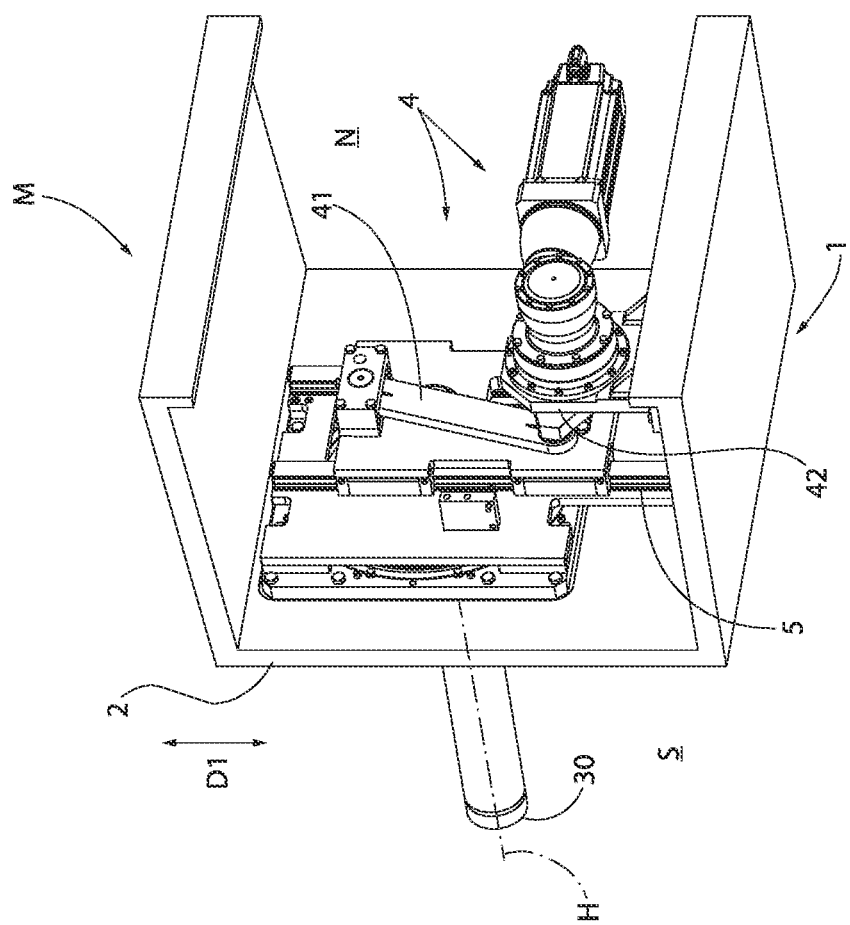
FIGS. 6 and 7 are similar views to FIGS. 1 and 2, respectively, in a second operating situation of the system.
Figure 6:
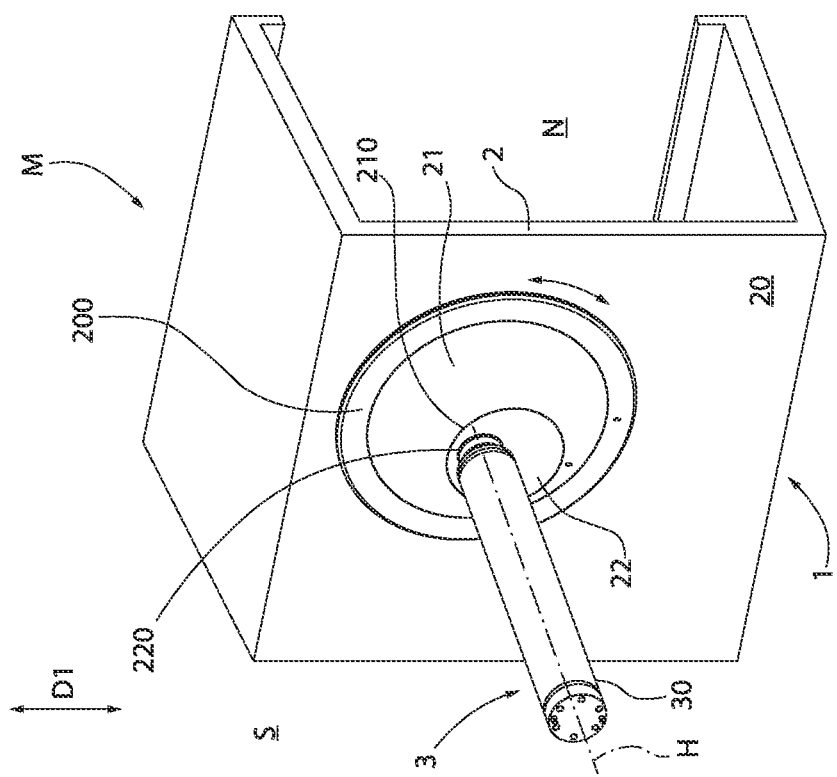
Figure 9:
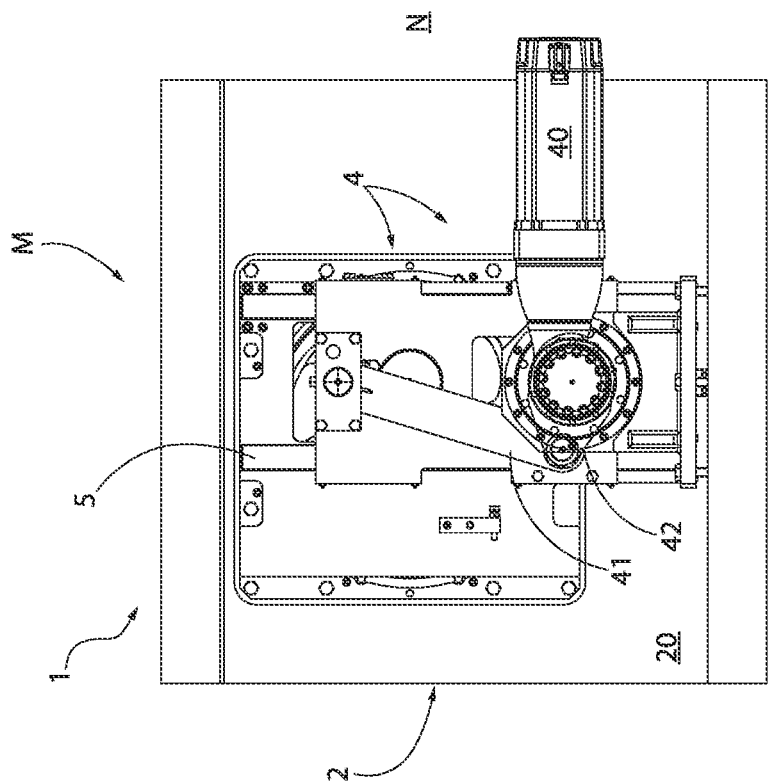
FIGS. 8 and 9 are similar views to FIGS. 3 and 4, respectively, in the second operating situation of the system.
Figure 8:
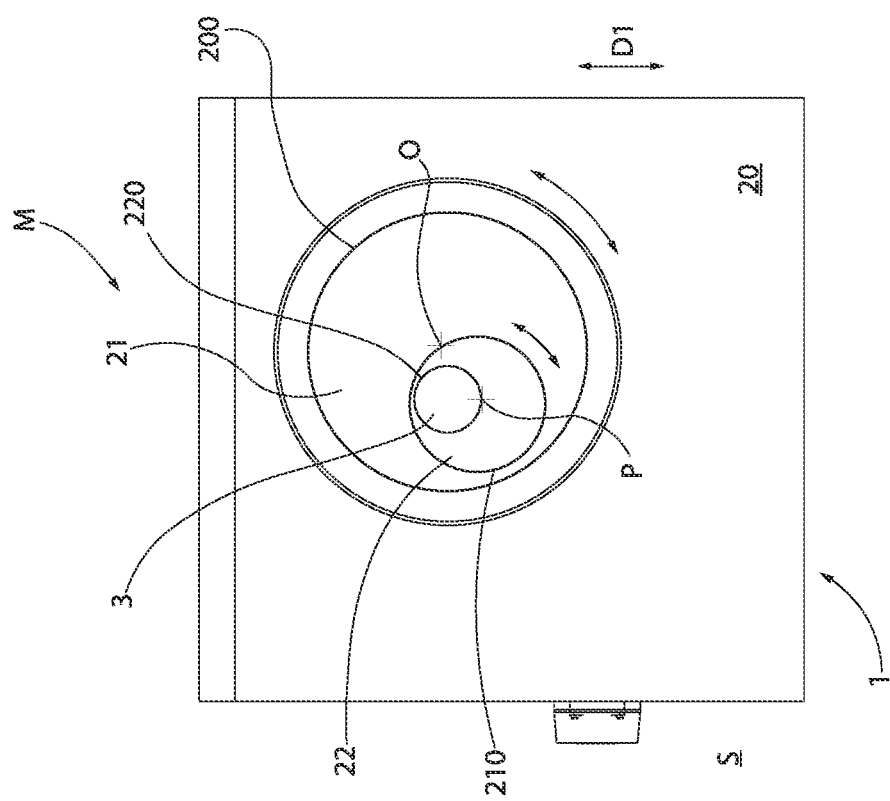

Preferably, the rotary sealing means 200, 210, 220 (better seen in FIG. 5, illustrated only schematically and indicatively in FIGS. 1, 3, 6, 8) comprise a first sealing and supporting ring 200, arranged between the first part 20 and the first disk 21, at the first housing (i.e. at the first circular edge); a second sealing and supporting ring 210, arranged between the first disk 21 and the second disk 22, at the second housing (i.e. at the second circular edge); and a third sealing and supporting ring 220, arranged between the second disk 22 and the movement actuating element 3, at the third housing (i.e. at the third circular edge). Moreover, the rotary sealing means comprise roller bearings or bushings (not indicated in the attached figures), associated with the aforementioned sealing and supporting rings 200, 210, 220, arranged in the activation zone N, to allow mutual rotation between the parts.

The rotary sealing means 200, 210, 220, therefore, guarantee the hermetic seal between the processing zone S and the activation zone N, as well as the possible movement of the components of the system 1.

Clearly, other means can be provided which function equivalently to the one described above.

Preferably, the system 1 comprises guiding means 5, arranged in the activation zone N, connected to the movement actuating element 3 for guiding the movement actuating element 3 at least along the aforementioned first direction D1, transverse to the respective axis H. The guiding means 5 offer support and stability to the element 3 during the relative movement. In FIGS. 2, 4, 5, 7, 9, the guiding means comprise a slide 5.

According to a preferred embodiment, the guiding means 5 and the movement actuating means 4 are arranged for guiding and moving the movement actuating element 3 also along a second direction, transverse to the respective axis H and different from the first direction D1.

For example, the guiding means 5 and the movement actuating means 4 are arranged for guiding and moving the movement actuating element 3 so that it can perform a "L-like" trajectory in the processing zone S, or a curvilinear or oblique trajectory with respect to the first direction D1 (situation not illustrated).

Clearly, the guiding means 5 and the movement actuating means 4 can be arranged for guiding and moving the movement actuating element 3 also along other directions different from what has been described, provided that said movement directions lie on planes perpendicular to the rotation axes of the first disk 21 and of the second disk 22 (i.e. to the rotation axes of the first rotoidal torque and of the second rotoidal torque), as well as to the rotation axis of the third rotoidal torque.

With reference to FIGS. 1-9, the movement actuating means 4 are arranged to act directly on the movement actuating element 3 to move it along the first direction D1, with the first disk 21 and the second disk 22, which rotate as a consequence of the movement of the movement actuating element 3. In other words, the first disk 21 and the second disk 22, in this case, passively follow the movement of the movement actuating element 3.

For example, with particular reference to the attached FIGS. 2, 4, 5, 7, 9, the movement actuating means 4 comprise a motor 40 and a connecting rod-crank system 41, 42 moved by the motor 40 and connected to the movement actuating element 3.

Figure 10:
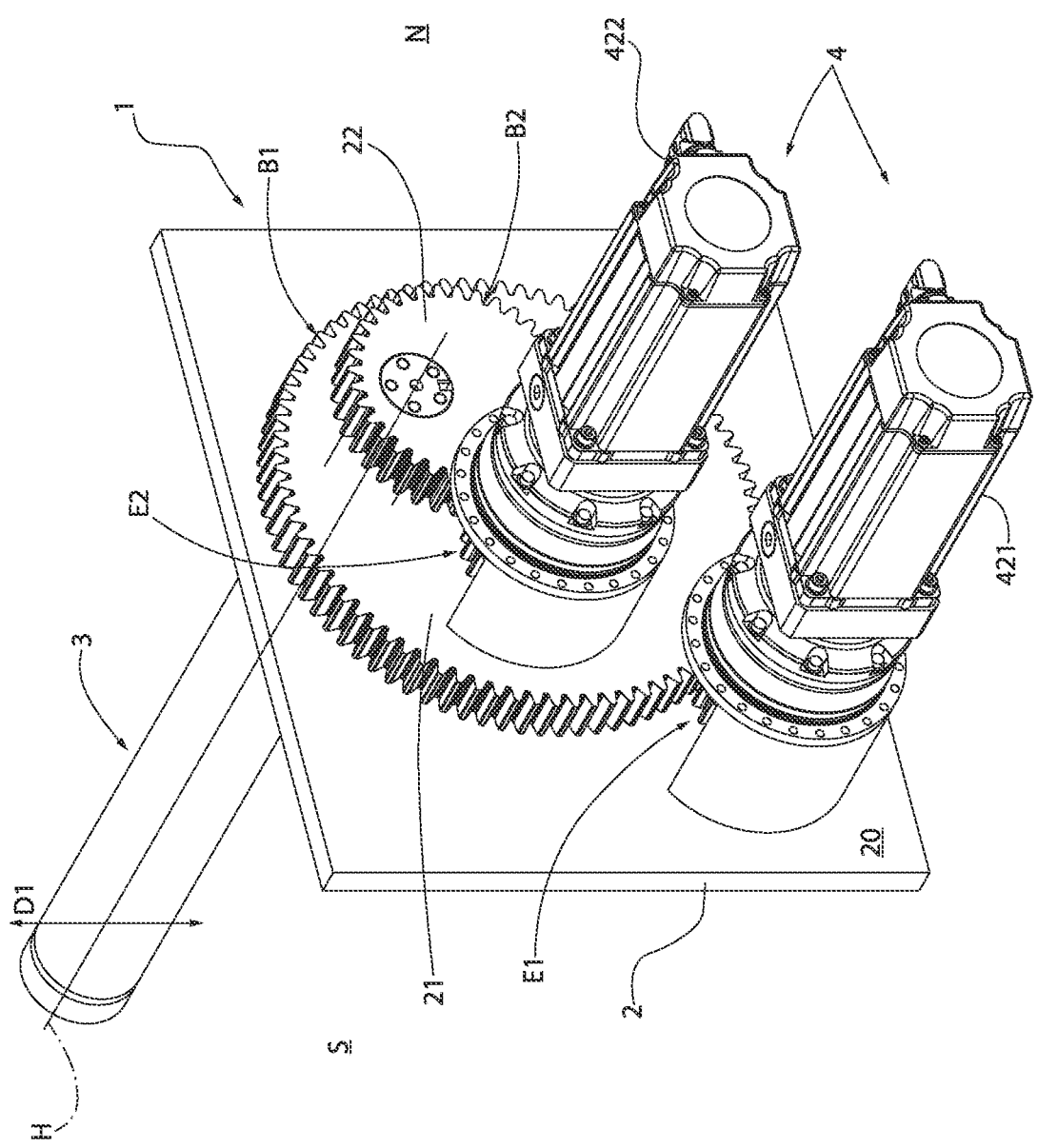
FIG. 10 is a perspective view of movement actuating means, that are part of the system according to the invention, alternative to those visible in FIGS. 2, 4, 5, 7 and 9.

According to an alternative, illustrated for example in FIG. 10, the movement actuating means 4 are arranged to act on the first disk 21 and on the second disk 22 to indirectly move the movement actuating element 3 along the first direction D1.

For example, with reference to FIG. 10, the movement actuating means 4 comprise a first motor 421 and a second motor 422, arranged to directly move the first disk 21 and the second disk 22, respectively. As can be seen from the schematization of FIG. 10, respective cogged ends E1, E2 (in application formed, for example, by cogged belts or wheels) are connected to the first motor 421 and to the second motor 422; similarly, the first disk 21 and the second disk 22 have cogged edges B1, B2 arranged in the activation zone N, capable of meshing respectively with the cogged end E1 of the first motor 421 and with the cogged end E2 of the second motor 422, so as to transfer the rotation movement from the two motors 421, 422 to the two disks 21, 22. In this case, clearly, the system 1 comprises constraining means (not illustrated) to prevent rotation of the movement actuating element 3. The rotation of the movement actuating element 3 can, in any case, be actuated independently and controlled by suitable control means not illustrated, arranged in the activation zone.

Clearly, the movement actuating means 4 can comprise any other system suitable for moving the element 3 at least along the aforementioned first direction D1.

With reference to FIG. 5, the movement actuating element 3 can be shaped to define on the inside thereof a housing 31, communicating with the activation zone N, which can be used for different purposes, as will be explained in the following.

For example, the movement actuating element 3, at the respective portion 30 arranged in the processing zone S, carries operating means (not illustrated), to act in the processing zone S. Said operating means can be formed by at least a clamp or a suction cup, or by a combination of different elements. In this case, the system 1 can further comprise control means (not illustrated), arranged within the housing 31 of the movement actuating element 3, and which develop from the activation zone N, to control the operating means independently of the movement of the element 3 itself. For example, the control means can be arranged to activate the opening and closing of a clamp or the action of a suction cup.

Within the housing 31 a mechanism for moving the operating means can be arranged, which, for example, allows to rotate the latter in two opposite rotation directions around a rotation axis parallel to or coinciding with the axis H of the movement actuating element 3.

According to another alternative, the housing 31 defined within the movement actuating element 3 can be used as a passage for conveying into the processing zone S processing liquids or gases (nitrogen, compressed air, vacuum, etc.) or electrical connections from the activation zone N.

According to the same principle as described above, the scope of protection of the invention also comprises the case in which the first disk comprises two second housings, within which two second disks are arranged, to each of which a corresponding movement actuating element is rotatably constrained (situation not illustrated). In this case, the movement of the two second disks can be carried out synchronously or independently, i.e. using the same actuator or two separate actuators.

According to another alternative, which is also not illustrated, it can be provided that the first disk is provided with two second housings, within which two second disks are arranged, mutually constrained, and there is only one movement actuating element fixed to one of the two second disks. In this case, the second disk to which the movement actuating element is not constrained can act as a support, for example, for a support element (e.g. a sleeve) fixed thereto and which protrudes only in the processing zone (without therefore also affecting the activation zone). This support element can be useful to facilitate operations in the processing zone; in particular, the support element can be connected to the movement actuating element to form a kinematic mechanism which follows the movement of the whole system 1 and which can be used to support suitable means, which operate in the processing zone (e.g. to ensure, in an optimal manner, support to a tray).

The invention further relates to a packaging machine M, only partially illustrated in the attached figures.

The machine comprises a processing zone S, in which products to be packaged are conveyed (i.e. filled, capped, etc.).

The machine M further comprises an activation zone N, arranged adjacent to the processing zone S, and a sealing and guiding system 1 according to one of the embodiments described above.

Consequently, the machine M thus presents the same advantages of the system 1, as it comprises it.

Clearly, in the machine M, the separating wall 2 of the abovementioned system 1 is arranged between the processing zone S and the activation zone N, as previously described.

As already specified in the introductory part of the present discussion, the packaging machine M can, for example, be an automatic machine used in fields such as foodstuffs (for example, a machine for packaging yogurt jars), pharmaceutical (e.g. machine for filling vials or flasks), cosmetic (e.g. machine for packaging tubes of cream products) or in any other field where sterility, high hygiene or in any case a clear separation between two environments with different requirements (e.g. applications in modified atmospheres) is required.

As anticipated above, it is clear that the invention finds advantageous application in particular in all the fields in which high hygiene or even asepticity is required. The use of rotating seals instead of translating means is certainly preferred in these fields since it allows the transmission of motion without any element passing from the activation zone to the processing zone. With the proposed invention, the translating movement is achieved by way of the use of rotary sealing means, which therefore allows to overcome the problems of known art.

The invention claimed is:

1. A sealing and guiding system (1) for a packaging machine (M) comprising a processing zone (S), for receiving products to be processed, and an activation zone (N), that are adjacent each other;

the system (1) comprises: a separating wall (2), for separating the processing zone (S) from the activation zone (N); at least one movement actuating element (3), that develops from the activation zone (N) to the processing zone (S), crossing the separating wall (2) and has a longitudinal developing axis (H); movement actuating means (4), that are arranged in the activation zone (N), for moving the movement actuating element (3) at least along a first direction (D1), transverse to the respective axis (H);

wherein, with the system (1), the movement actuating element (3) is not subjected to axial translations;

wherein the separating wall (2) comprises:

a first part (20) comprising at least a first housing circular seat delimited by a first circular edge;

at least a first disk (21), which is inserted in the first circular seat so as to be rotatable with respect to the first part (20) and is coplanar with the first part (20); the first disk (21) comprises in turn at least a second circular seat delimited by a second circular edge, that is eccentric with respect to the center (O) of the first disk (21); and at least a second disk (22), which is inserted in the second circular seat so as to be rotatable with respect to the first disk (21) and is coplanar with the first disk (21); the second disk (22) comprises, in turn, a third circular seat delimited by a third circular edge, that is eccentric with respect to the center (P) of the second disk (22);

wherein movement actuating element (3) is inserted in the third circular seat so as to be rotatable with respect to the second disk (22); and wherein the system (1) comprises rotary sealing means (200, 210, 220), arranged at the first circular seat, at the second circular seat and at the third circular seat, allowing the sealing between the processing zone (S) and the activation zone (N) and the relative rotation of the first disk (21), of the second disk (22) and of the movement actuating element (3).

2. The system according to claim 1, wherein the movement actuating means (4) are arranged for directly acting on the movement actuating element (3) for moving it along the first direction (D1), with the first disk (21) and the second disk (22) which rotate due to the movement of the movement actuating element (3).

3. The system (1) according to claim 2, wherein the movement actuating means (4) comprise a motor (40) and a rod-crank system (41, 42), connected to the movement actuating element (3).

4. The system (1) according to claim 1, wherein the movement actuating means (4) are arranged to act on the first disk (21) and on the second disk (22) for indirectly moving the movement actuating element (3) along the first direction (D1).

5. The system (1) according to claim 4, wherein the movement actuating means (4) comprise a first motor (421) and a second motor (422), arranged for directly moving the first disk (21) and the second disk (22), respectively; the first motor (421) and the second motor (422) comprising respective cogged ends (E1, E2); and the first disk (21) and the second disk (22) comprising respective cogged edges (B1, B2) arranged at the activation zone (N), suitable to mesh with the cogged end (E1) of the first motor (421) and with the cogged end (E2) of the second motor (422), respectively.

6. The system (1) according to claim 1, further comprising guiding means (5), arranged at the activation zone (N), connected to the movement actuating element (3) for guiding the movement actuating element (3) at least along said first direction (D1) transverse to the respective axis (H).

7. The system (1) according to claim 6, wherein the guiding means (5) and the movement actuating means (4) are arranged for guiding and moving the movement actuating element (3) also along a second direction, transverse to the respective axis (H) and different from the first direction (D1).

8. The system (1) according to claim 1, wherein the movement actuating element (3) is shaped so as to define on the inside thereof a chamber (31), that communicates with the activation zone (N).

9. The system (1) according to claim 8, wherein the movement actuating element (3) carries operating means at a respective portion (30) that is arranged in the processing zone (S), for operating in the processing zone (S); the system (1) further comprising control means, arranged within the chamber (31) of the movement actuating element (3), for controlling the operating means independently of the movement of the element (3).

10. The system (1) according to claim 8, wherein the chamber (31) of the movement actuating element (3) forms a passage for conveying processing liquids or gases, or electrical connections, into the processing zone (S).

11. A packaging machine (M), comprising:

a processing zone (S), in which products to be packaged are conveyed;

an activation zone (N), arranged adjacent to the processing zone (S);

and a sealing and guiding system (1) according to claim 1.

* * * * *